(12) United States Patent
Tani et al.

(10) Patent No.: US 11,322,176 B2
(45) Date of Patent: May 3, 2022

(54) METHOD OF MANUFACTURING MAGNETIC RECORDING MEDIUM

(71) Applicants: SHOWA DENKO K.K., Tokyo (JP); The School Corporation Kansai University, Osaka (JP)

(72) Inventors: Hiroshi Tani, Osaka (JP); Hiroshi Sakai, Tokyo (JP); Eishin Yamakawa, Tokyo (JP); Kazuki Shindo, Tokyo (JP)

(73) Assignees: SHOWA DENKO K.K., Tokyo (JP); The School Corporation Kansai University, Osaka (JP)

( * ) Notice: Subject to any disclaimer, the term of this patent is extended or adjusted under 35 U.S.C. 154(b) by 66 days.

(21) Appl. No.: 16/896,401

(22) Filed: Jun. 9, 2020

(65) Prior Publication Data

US 2020/0395045 A1    Dec. 17, 2020

(30) Foreign Application Priority Data

Jun. 17, 2019    (JP) .............................. JP2019-112236

(51) Int. Cl.
*G11B 5/84*    (2006.01)
*G11B 5/851*    (2006.01)
(Continued)

(52) U.S. Cl.
CPC .......... *G11B 5/8408* (2013.01); *C08G 65/007* (2013.01); *G11B 5/725* (2013.01); *G11B 5/85* (2013.01); *G11B 5/851* (2013.01)

(58) Field of Classification Search
CPC .... C08G 65/007; G11B 5/725; G11B 5/7253; G11B 5/7257; C23C 16/50
See application file for complete search history.

(56) References Cited

U.S. PATENT DOCUMENTS

| 5,543,203 A | * | 8/1996 | Tani | ........................ | G11B 5/72 428/209 |
| 7,440,233 B2 | | 10/2008 | Takahashi | | |

(Continued)

FOREIGN PATENT DOCUMENTS

| CN | 1716390 | 1/2006 |
| CN | 108570666 | 9/2018 |

(Continued)

OTHER PUBLICATIONS

Tani et al, IEEE Transactions on Magnetics, vol. 53, No. 3(2017) 3300906. (Year: 2017).*

*Primary Examiner* — Tabassom Tadayyon Eslami
(74) *Attorney, Agent, or Firm* — IPUSA, PLLC

(57) ABSTRACT

A method of manufacturing a magnetic recording medium forms an unfinished product including a magnetic recording layer and a protection layer that are successively formed on a substrate, and forms a lubricant layer on the protection layer of the unfinished product. The lubricant layer is formed by coating a first organic fluorine compound on the protection layer of the unfinished product, and supplying a gas, including a second organic fluorine compound, onto the protection layer of the unfinished product, and decomposing the second organic fluorine compound by Townsend discharge and ultraviolet ray irradiation. The protection layer includes carbon, and the first organic fluorine compound includes a functional group at a terminal thereof.

9 Claims, 3 Drawing Sheets

(51) Int. Cl.
  *C08G 65/00*    (2006.01)
  *G11B 5/85*    (2006.01)
  *G11B 5/725*    (2006.01)

(56)     References Cited

U.S. PATENT DOCUMENTS

| | | | |
|---|---|---|---|
| 2005/0282045 A1 | 12/2005 | Sonoda | |
| 2010/0073805 A1* | 3/2010 | Amano | G11B 5/6064 360/75 |
| 2014/0295072 A1* | 10/2014 | Okabe | G11B 5/8408 427/127 |
| 2018/0257105 A1 | 9/2018 | Tani et al. | |

FOREIGN PATENT DOCUMENTS

| | | |
|---|---|---|
| JP | 2000-017281 | 1/2000 |
| JP | 2006-147012 | 6/2006 |
| JP | 2014-191847 | 10/2014 |
| JP | 2018-150574 | 9/2018 |

\* cited by examiner

FIG.4

| | First organic fluorine compound | Second organic fluorine compound | Bonded ratio [%] | Dynamic coefficient of friction | Surface energy [mJ/m$^2$] |
|---|---|---|---|---|---|
| EI1 | SH-1 | D02TS | 99 | 0.36 | 16.5 |
| EI2 | SH-1 | D02 | 99 | 0.38 | 16.7 |
| CE1 | – | D02TS | 89 | 0.45 | 16.8 |
| CE2 | SH-1 | – | 40 | 0.33 | 18.3 |
| CE3 | – | D02 | 85 | 0.49 | 17.0 |

METHOD OF MANUFACTURING MAGNETIC RECORDING MEDIUM

CROSS-REFERENCE TO RELATED APPLICATIONS

This application is based upon and claims priority to Japanese Patent Application No. 2019-112236 filed on Jun. 17, 2019, the entire contents of which are incorporated herein by reference.

BACKGROUND OF THE INVENTION

1. Field of the Invention

The present invention relates to a method of manufacturing magnetic recording medium.

2. Description of the Related Art

Recently, a magnetic storage apparatus is implemented in various products, including personal computers, video recorders, data servers, or the like. Hence, the importance of the magnetic storage apparatus is increasing. The magnetic storage apparatus includes a magnetic recording medium that magnetically stores electronic data. Examples of the magnetic storage apparatus include magnetic disk drives, flexible disk drives, magnetic tape drives, or the like, for example. Examples of the magnetic disk drive include a hard disk drive (HDD) or the like, for example.

Generally, the magnetic recording medium may be manufactured by successively depositing an underlayer, an intermediate layer, a magnetic recording layer, and a protection layer, in this order, on a nonmagnetic substrate, and thereafter coating a lubricant layer on a surface of the protection layer, for example. A material used for the lubricant layer may be perfluoropolyether, for example.

Methods of forming the lubricant layer on the surface of the protection layer include dipping, spin-coating, vapor-lubrication, or the like, as described in Japanese Laid-Open Patent Publication No. 2014-191847, for example.

In addition, it is known to form a free layer that includes a lubricant component and is freely movable toward an outer peripheral side of the substrate by rotating the magnetic recording medium around a center of the substrate as the center of rotation, on a bond layer that includes the lubricant component and is adhered on the protection layer, as described in Japanese Laid-Open Patent Publication No. 2006-147012, for example.

Moreover, it is known to form the lubricant layer that includes a fluorine-containing monocarboxylic acid having a perfluoropolyether group, on a carbon layer having a nitrogen-containing plasma polymerization layer at a surface layer portion, as described in Japanese Laid-Open Patent Publication No. 2000-17281, for example.

Furthermore, a thin film manufacturing method including the steps of arranging a work inside a chamber, supplying a process gas into the chamber in a state where the inside of the chamber is maintained at a predetermined pressure, to form the lubricant layer on a surface of the work, irradiating ultraviolet rays having an energy of 3 eV or higher and 10 eV or lower on the surface of the work, to emit photoelectrons from the surface of the work, and applying an AC electric field to the surface of the work, is described in Japanese Laid-Open Patent Publication No. 2018-150574, for example. The work is an unfinished product of the magnetic disk, the process gas is an organic matter having a perfluoropolyether structure, and the AC electric field has an electric field intensity that generates Townsend discharge without generating glow discharge plasma.

When an accidental contact between the magnetic recording medium and a magnetic head is taken into consideration, a surface on the side of the magnetic recording medium formed with the lubricant layer desirably has a low dynamic coefficient of friction. In addition, when a corrosion resistance of the magnetic recording medium is taken into consideration, a coverage of the surface of the protection layer by the lubricant layer is desirably high, that is, a surface energy of the surface on the side of the magnetic recording medium formed with the lubricant layer is desirably low. Such properties may be obtained when the lubricant layer including the free layer is made thick. However, in order to reduce a spacing loss between the magnetic recording layer and the magnetic head, the lubricant layer is desirably made thin. Moreover, because the free layer may be transferred onto the magnetic head to contaminate the magnetic head, a bonded ratio of the lubricant layer is desirably large.

SUMMARY OF THE INVENTION

One object of embodiments of the present invention is to provide a method of manufacturing a magnetic recording medium, which can manufacture a magnetic recording medium having a lubricant layer with a large bonded ratio, without making the lubricant layer thick, and having the dynamic coefficient of friction and the surface energy that are low at the surface on the side of the magnetic recording medium formed with the lubricant layer.

A more specific object of the embodiments of the present invention is to provide a method of manufacturing a magnetic recording medium, that includes forming an unfinished product of the magnetic recording medium, including a magnetic recording layer and a protection layer that are successively formed on a substrate; and forming a lubricant layer on the protection layer of the unfinished product, wherein the forming the lubricant layer includes coating a first organic fluorine compound on the protection layer of the unfinished product, and supplying a gas, including a second organic fluorine compound, onto the protection layer of the unfinished product, and decomposing the second organic fluorine compound by Townsend discharge and ultraviolet ray irradiation, wherein the protection layer includes carbon, and the first organic fluorine compound includes a functional group at a terminal thereof.

The first organic fluorine compound may have a perfluoropolyether structure, a carboxyl group or a hydroxyl group at one terminal thereof, and a weight average molecular weight of 1500 or greater.

Further, the second organic fluorine compound may have a perfluoropolyether structure, and a weight average molecular weight of 700 or greater, and the supplying the gas may decompose the second organic fluorine compound, to generate a compound having a weight average molecular weight of 500 or less.

Other objects and further features of the present invention will be apparent from the following detailed description when read in conjunction with the accompanying drawings.

BRIEF DESCRIPTION OF THE DRAWINGS

FIG. 4 is a diagram illustrating evaluation results of magnetic recording media according to exemplary implementations and comparison examples.

DESCRIPTION OF THE PREFERRED EMBODIMENTS

Figure 1:
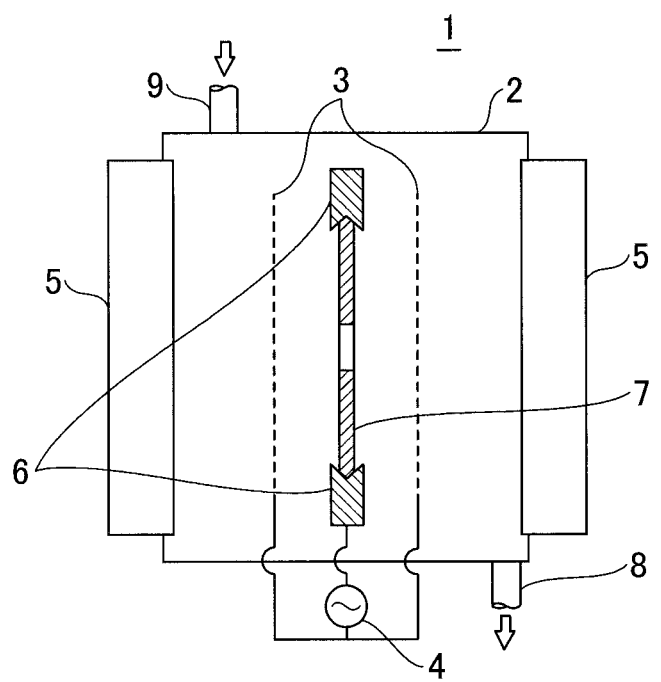
FIG. 1 is a diagram schematically illustrating an example of a thin film forming apparatus used in a process B.

Embodiments and exemplary implementations of a method of manufacturing a magnetic recording medium according to the present invention will be described, by referring to the drawings. In each of the embodiments, the configuration, arrangements or positions, materials, and amounts (at %, mol %, and mass %) of elements used in the magnetic recording medium or the magnetic storage apparatus may be appropriately modified, unless indicated otherwise.

[Method of Manufacturing Magnetic Recording Medium]

The method of manufacturing the magnetic recording medium according to one embodiment successively forms a magnetic recording layer and a protection layer, in this order, on a substrate, to form an unfinished product of the magnetic recording medium. The unfinished product is sometimes also referred to as an incomplete product, or a half-finished product. This method further includes a lubricant layer forming process or step that forms a lubricant layer on the protection layer of the unfinished product.

In the unfinished product of the magnetic recording medium, the magnetic recording layer and the protection layer are formed on one side or on both sides of the substrate.

[Lubricant Layer Forming Process]

The lubricant layer forming process includes a process or step A, and a process or step B. The process A coats a first organic fluorine compound on the protection layer of the unfinished product of the magnetic recording medium. The process B supplies a gas, including a second organic fluorine compound, onto the protection layer of the unfinished product of the magnetic recording medium, and decomposes the second organic fluorine compound by Townsend discharge and ultraviolet ray irradiation.

The protection layer includes carbon, and the first organic fluorine compound includes a functional group at a terminal thereof.

The process A mainly forms a free layer included in the lubricant layer. The process B mainly forms a bond layer included in the lubricant layer.

The process A causes adsorption of the first organic fluorine compound to adsorption sites on the surface of the protection layer via the functional group. The first organic fluorine compound functions as the free layer, and reduces the dynamic coefficient of friction of the surface on the side of the magnetic recording medium formed with the lubricant layer.

For example, in a case where the protection layer is a carbon layer doped with nitrogen, carbon nitride becomes the adsorption site.

In addition, in a case where the protection layer is a carbon layer, a concave portion or a convex portion formed at the surface of the protection layer becomes the adsorption site.

Because the free layer formed by the process A includes the first organic fluorine compound adsorbed to the protection layer, it is possible to reduce the transfer of the free layer onto a magnetic head, which transfer would otherwise contaminate the magnetic head.

The process B forms the bond layer by causing chemical bonding of a decomposition product of the second organic fluorine compound forming the lubricant layer onto the surface of the protection layer. Because the chemical bonding in the process B is considerably firm compared to the adsorption in the process A, it is possible to improve the thermal stability of the lubricant layer. In other words, although the first organic fluorine compound adsorbed to the adsorption sites of the protection layer in the process A separates from the surface of the protection layer near a boiling point of the first organic fluorine compound, the decomposition product of the second organic fluorine compound chemically bonded to the surface of the protection layer in the process B will not separate from the surface of the protection layer near a boiling point of the second organic fluorine compound. Further, the decomposition product of the second organic fluorine compound chemically bonded to the surface of the protection layer in the process B will not separate from the surface of the protection layer and thus will not be transferred onto the magnetic head, to prevent contamination of the magnetic head.

In addition, the decomposition product of the second organic fluorine compound in the process B is in an active state under the environment of the Townsend discharge and the ultraviolet ray irradiation, and also chemically bonds to locations other than the adsorption sites on the surface of the protection layer. For this reason, a coverage of the surface of the protection layer by the lubricant layer improves, and as a result, a corrosion resistance of the magnetic recording medium improves.

[Process A]

The method of coating the first organic fluorine compound on the surface of the protection layer in the process A is not particularly limited, and known methods may be employed, including dipping, spin-coating, vapor-lubrication, or the like, for example.

When coating the first organic fluorine compound on the surface of the protection layer by dipping, the unfinished product of the magnetic recording medium is dipped into a coating liquid that includes the first organic fluorine compound diluted by an organic solvent, and the unfinished product is thereafter extracted from the coating liquid at a predetermined speed, for example.

When coating the first organic fluorine compound on the surface of the protection layer by spin-coating, the coating liquid that includes the first organic fluorine compound diluted by the organic solvent is sprayed from a nozzle onto the surface of the unfinished product of the magnetic recording medium, and the unfinished product is thereafter rotated at a high speed to remove the excessive coating liquid, for example.

When coating the first organic fluorine compound on the surface of the protection layer by vapor-lubrication, the first organic fluorine compound is heated to generate vapor, and the vapor is thereafter introduced into a chamber in which the unfinished product of the magnetic recording medium is arranged, for example. The temperature to which the first organic fluorine compound is heated may be approximately 90° C. to approximately 150° C., for example. A pressure inside the chamber may be approximately 1 Pa to approximately 50 Pa, for example. An exposure time of the unfinished product inside the chamber may be approximately 2 seconds to approximately 30 seconds, for example. As a result, it is possible to form a free layer having a uniform thickness.

The first organic fluorine compound preferably has the perfluoropolyether structure. In this case, it is possible to further reduce the surface energy of the surface on the side of the magnetic recording medium formed with the lubricant layer.

Examples of the organic solvent that dilutes the first organic fluorine compound include fluorine solvents such as Vertrel XF manufactured by Chemours-Mitsui Fluoroproducts Co., Ltd. or the like, for example.

The perfluoropolyether structure refers to a structure in which a majority of hydrogen atoms of hydrocarbon is substituted by fluorine atoms, and is a generic designation for a structure including an ether bond (—C—O—C—) as a principal chain within the structure.

The perfluoropolyether may be either a single polymer, or a copolymer such as a random copolymer and a block copolymer.

Examples of the perfluoropolyether structure include the structures represented by the following general formulas (a) through (h), for example, where each of p, q, r, s, t, u, v, w, x, y, and z denotes a degree of polymerization. In a case where a plurality of kinds of perfluoroalkyleneoxy group, that is a building block, exist, the sequence in which the building blocks are bonded may be arbitrary, and the perfluoropolyether structure may be a random copolymer, for example.

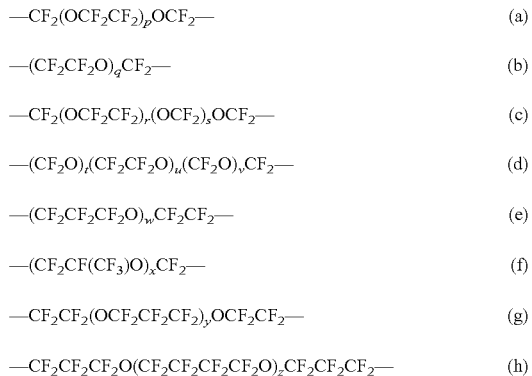

The first organic fluorine compound may include a functional group at one terminal thereof or at both terminals thereof.

In the first organic fluorine compound including the functional group at one terminal thereof, the other terminal that does not include the functional group includes a hydrogen atom, an alkyl group having a carbon number 1 to 4 (1C to 4C), a halogen atom such as an alkyl halide group having a carbon number 1 to 4, a fluorine atom, or the like, for example.

The first organic fluorine compound preferably includes a carboxyl group or a hydroxyl group at one terminal thereof. In this case, only one terminal of the first organic fluorine compound is adsorbed to the adsorption sites on the surface of the protection layer, and the other terminal of the first organic fluorine compound is in a free state. For this reason, it is possible to further reduce the dynamic coefficient of friction of the surface on the side of the magnetic recording medium formed with the lubricant layer, and more easily reduce an impact on the lubricant layer caused by an accidental contact of the magnetic head.

A weight average molecular weight of the first organic fluorine compound is preferably 1500 or greater. In this case, the dynamic coefficient of friction of the surface on the side of the magnetic recording medium formed with the lubricant layer is reduced, and it is possible to further reduce the transfer of the free layer onto the magnetic head, which transfer would otherwise contaminate the magnetic head. In addition, because the boiling point of the first organic fluorine compound becomes high, the first organic fluorine compound is unlikely to separate from the protection layer.

[Process B]

FIG. 1 is a diagram schematically illustrating an example of a thin film forming apparatus used in the process B.

A thin film forming apparatus (or thin film deposition apparatus) 1 includes a chamber 2, counter electrodes 3, a power supply 4, and a light source 5. An unfinished product 7 of the magnetic recording medium is held inside the chamber 2 by a holder 6.

The unfinished product 7 of the magnetic recording medium includes, for example, a disk-shaped substrate having an opening at a center thereof, and a magnetic recording layer and a protection layer that are successively formed in this order on both sides (that is, opposite surfaces) of the substrate.

An exhaust device (not illustrated) is connected to the chamber 2 via an exhaust port 8, so that a pressure inside the chamber 2 can be reduced to a predetermined pressure. When forming a thin film of the decomposition product of the second organic fluorine compound, the inside of the chamber 2 is reduced to approximately 0.001 atm to 1 atm, so that the Townsend discharge is easily generated between the unfinished product 7 of the magnetic recording medium and the counter electrodes 7. Further, a process gas including the second organic fluorine compound is supplied into the chamber 2 via a supply port 9.

The unfinished product 7 of the magnetic recording medium and the counter electrodes 3 are arranged inside the chamber 2, and are respectively connected to terminals of the power supply 4. The counter electrodes 3 are arranged to respectively oppose the opposite surfaces of the unfinished product 7 of the magnetic recording medium. Moreover, the counter electrodes 3 have a mesh configuration so as to pass ultraviolet rays emitted from the light source 5.

The power supply 4 may be an AC bias power supply that is configured to apply an AC bias voltage between the unfinished product 7 of the magnetic recording medium and the counter electrodes 3, to thereby apply an AC electric field on the opposite surfaces of the unfinished product 7 of the magnetic recording medium.

In the thin film forming apparatus 1, the AC bias voltage is applied to the unfinished product 7 of the magnetic recording medium via the holder 6 that is conductive.

An amplitude (or electric field intensity) of the AC electric field is adjusted so as to generate the Townsend discharge without generating glow discharge plasma between the unfinished product 7 of the magnetic recording medium and the counter electrodes 3.

A DC power supply may be used instead of using the AC bias power supply for the power supply 4. In this case, an inverter may be provided to convert a DC voltage from the DC power supply into an AC voltage, to apply the AC electric field on the opposite surfaces of the unfinished product 7 of the magnetic recording medium.

The power supply 4 is preferably a high-frequency (pulse) bias power supply. In this case, a high-frequency (pulse) bias voltage is applied to the surfaces of the unfinished product 7 of the magnetic recording medium.

The light source 5 irradiates the ultraviolet rays on the opposite surfaces of the unfinished product 7 of the magnetic recording medium.

An energy of the ultraviolet rays is higher than a work function of a material forming the protection layer of the unfinished product 7 of the magnetic recording medium, and is 3 eV to 10 eV, and preferably 4 eV to 9 eV.

For example, a lower-pressure mercury lamp, an excimer lamp, a heavy hydrogen lamp, a xenon lamp, or the like may be used for the light source 5.

When forming the thin film of the decomposition product of the second organic fluorine compound, the unfinished product 7 of the magnetic recording medium is preferably heated to approximately 100° C. Hence, the thin film forming apparatus 1 is preferably provided with a heater mechanism.

A known heater mechanism may be used for the heater mechanism of the thin film forming apparatus 1. For example, a Pt heater may be provided on the holder 6, or a lamp heater may be provided near the unfinished product 7 of the magnetic recording medium.

The second organic fluorine compound preferably has the perfluoropolyether structure. In this case, it is possible to further reduce the surface energy of the surface on the side of the magnetic recording medium formed with the lubricant layer.

Examples of the perfluoropolyether structure include the structures represented by the general formulas (a) through (h) mentioned above, for example.

The second organic fluorine compound has a weight average molecular weight of 700 or greater, and the second organic fluorine compound is preferably decomposed to generate a compound having a weight average molecular weight of 500 or less. In this case, the decomposition product of the second organic fluorine compound has a short molecular chain, and both terminals thereof are easily chemically bonded to the surface of the protection layer, so that the coverage of the surface of the protection layer by the decomposition product of the second organic fluorine compound is high. In addition, because a thin film of the decomposition product of the second organic fluorine compound is formed, a spacing loss of the magnetic recording medium is reduced.

A ratio of the bond layer within the lubricant layer, that is, a bonded ratio of the lubricant layer, is preferably 90% to 99%, and more preferably 95% to 99%. When the bonded ratio of the lubricant layer is 90% or higher, it is possible to further reduce the contamination of the magnetic head, and when the bonded ratio of the lubricant layer is 99% or lower, it is possible to further reduce the dynamic coefficient of friction of the surface on the side of the magnetic recording medium formed with the lubricant layer.

In the lubricant layer forming process, the order in which the process A and the process B are performed is not particularly limited. However, the process A and the process B are preferably performed in this order. It is also possible to adjust the bonded ratio of the lubricant layer according to the order in which the process A and the process B are performed.

[Unfinished Product of Magnetic Recording Medium]

Figure 2:
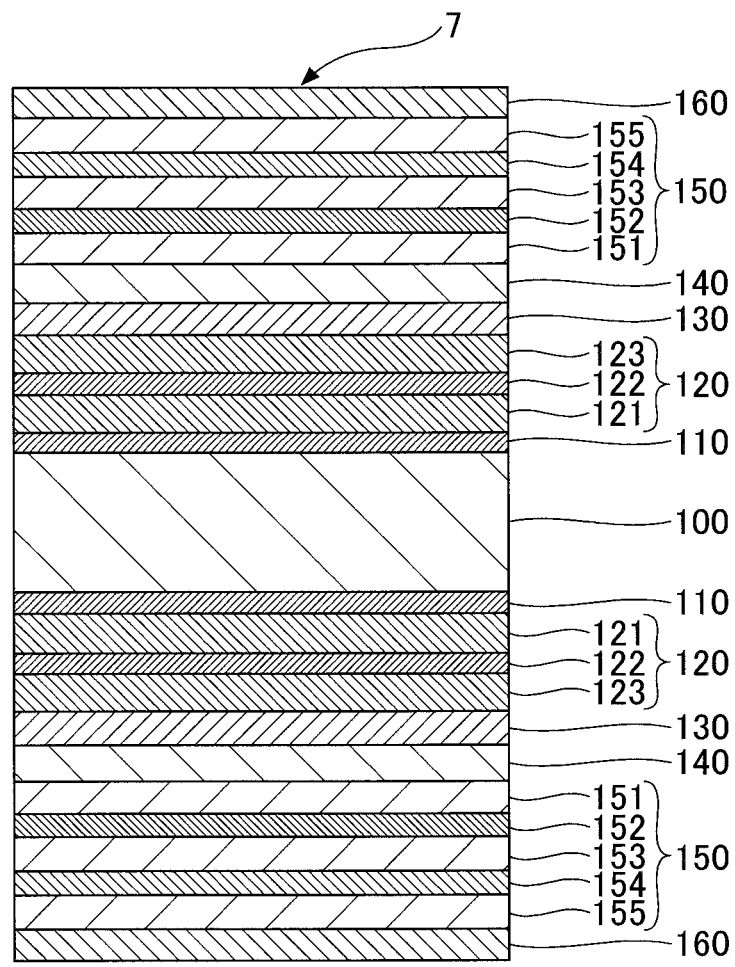
FIG. 2 is a cross sectional view illustrating an example of a laminated structure of an unfinished product of a magnetic recording medium illustrated in FIG. 1.

FIG. 2 is a cross sectional view illustrating an example of a laminated structure of the unfinished product 7 of the magnetic recording medium illustrated in FIG. 1.

The unfinished product 7 of the magnetic recording medium includes a substrate 100, an adhesion layer 110 formed on both sides (that is, opposite surfaces) of the substrate 10, a soft magnetic underlayer 120 formed on the adhesion layer 110, an orientation control layer 130 formed on the soft magnetic underlayer 120, a nonmagnetic underlayer 140 formed on the orientation control layer 130, a magnetic recording layer 150 formed on the nonmagnetic underlayer 140, and a protection layer 160 formed on the magnetic recording layer 150.

A nonmagnetic material used for the substrate 100 is not particularly limited, and may include metal materials such as aluminum, aluminum alloys, or the like, for example.

A NiP layer may be formed on the surface of the substrate 100 by plating, sputtering, or the like, for example.

When the substrate 100 makes contact with the soft magnetic underlayer 120, corrosion of the substrate 100 may progress due to the effects of an adsorption gas or moisture at the substrate surface, diffusion of the material forming the substrate 100, or the like. Hence, the adhesion layer 110 is formed between the substrate 100 and the soft magnetic underlayer 120, to reduce or delay such corrosion.

Examples of a material forming the adhesion layer 110 include Cr, Cr alloys, Ti, Ti alloys, or the like, for example.

The adhesion layer 110 preferably has a thickness of 2 nm (20 Å) or greater.

The soft magnetic underlayer 120 is formed to reduce noise when recording information to and reproducing information from the magnetic recording medium according to a perpendicular magnetic recording scheme.

The soft magnetic underlayer 120 includes a first soft magnetic layer 121 formed on the adhesion layer 110, a spacer layer 122 formed on the first soft magnetic layer 121, and a second soft magnetic layer 123 formed on the spacer layer 122.

The first soft magnetic layer 121 and the second soft magnetic layer 123 include a metal or an alloy having Co or Fe as a main component thereof.

The metal or the alloy having Co or Fe as the main component thereof includes FeCo alloys having an atomic ratio of Fe and Co in a range of 40:60 to 70:30, or the like, for example.

The first soft magnetic layer 121 and the second soft magnetic layer 123 preferably further include at least one of Ta, Nb, Zr, and Cr in a range of 1 at % to 8 at %, to improve a magnetic permeability and the corrosion resistance.

Examples of a material forming the spacer layer 122 include Ru, Re, Cu, or the like, for example. Ru is preferably used for the spacer layer 122.

The orientation control layer 130 is formed to refine crystal grains of the magnetic recording layer 150 that is laminated on the orientation control layer 130 via the nonmagnetic underlayer 140, and to improve recording and reproducing characteristics of the magnetic recording medium.

The orientation control layer 130 preferably includes a material having one of a hcp structure, a fcc structure, and an amorphous structure.

Examples of the material forming the orientation control layer 130 include Ru alloys, Ni alloys, Co alloys, Pt alloys, Cu alloys, or the like, for example.

The orientation control layer 130 may have a multi-layer structure.

For example, the orientation control layer 130 may be formed by laminating, from the side of the substrate 100, the Ni alloy and the Ru alloy, or the Co alloy and the Ru alloy, or the Pt alloy and the Ru alloy.

The nonmagnetic underlayer 140 is formed to reduce a disorder in crystal growth at an initial laminating portion of the magnetic recording layer 150, and to reduce the generation of the noise when recording information to and reproducing information from the magnetic recording medium.

The nonmagnetic underlayer 140 preferably includes a CoCr alloy and an oxide.

A Cr content in the CoCr alloy is preferably 25 at % to 50 at %.

Examples of the oxide include oxides of Cr, Si, Ta, Al, Ti, Mg, Co, or the like, for example. The oxide is preferably one of $TiO_2$, $Cr_2O_3$, and $SiO_2$.

Any one of the adhesion layer 110, the soft magnetic underlayer 120, the orientation control layer 130, and the nonmagnetic underlayer 140 may be omitted, as appropriate.

The magnetic recording layer 150 includes a first magnetic layer 151 formed on the nonmagnetic underlayer 140, a first nonmagnetic layer 152 formed on the first magnetic layer 151, a second magnetic layer 153 formed on the first nonmagnetic layer 152, a second nonmagnetic layer 154 formed on the second magnetic layer 153, and a third magnetic layer 155 formed on the second nonmagnetic layer 154.

The first magnetic layer 151, the second magnetic layer 153, and the third magnetic layer 155 preferably have a granular structure in which magnetic grains, made of a metal or an alloy having Co as a main component thereof, are respectively surrounded by a nonmagnetic oxide.

Examples of the nonmagnetic oxide include Cr, Si, Ta, Al, Ti, Mg, Co, or the like, for example. The nonmagnetic oxide is preferably one of $TiO_2$, $Cr_2O_3$, and $SiO_2$.

The first magnetic layer 151 preferably includes a complex oxide formed by two or more kinds of oxides.

Examples of the combination of the oxides forming the complex oxide include $Cr_2O_3$—$SiO_2$, $Cr_2O_3$—$TiO_2$, $Cr_2O_3$—$SiO_2$—$TiO_2$, or the like, for example.

Examples of the material forming the first magnetic layer 151, the second magnetic layer 153, and the third magnetic layer 155 include 90(Co14Cr18Pt)-10($SiO_2$){magnetic grain content of 90 mol % of magnetic grains with a Cr content of 14 at %, a Pt content of 18 at %, and remainder Co, and $SiO_2$ content of 10 mol %}, 92(Co10Cr16Pt)-8 ($SiO_2$), 94 (Co8Cr14Pt4Nb)-6($Cr_2O_3$), or the like, for example.

Other examples of the combinations of the materials forming the first magnetic layer 151, the second magnetic layer 153, and the third magnetic layer 155 include (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), or the like, for example.

The protection layer 160 is formed to reduce damage to the surface of the magnetic recording medium when the magnetic head makes contact with the magnetic recording medium, and to improve the corrosion resistance of the magnetic recording medium.

Examples of the protection layer 160 include an amorphous hard carbon (or hard amorphous carbon) layer, a diamond-like carbon (DLC) layer, or the like, for example.

The protection layer 160 preferably has a thickness in a range of 1 nm to 10 nm.

[Magnetic Storage Apparatus]

The magnetic recording medium manufactured by the method of manufacturing the magnetic recording medium according to this embodiment, may be applied to a magnetic storage apparatus, for example.

Figure 3:
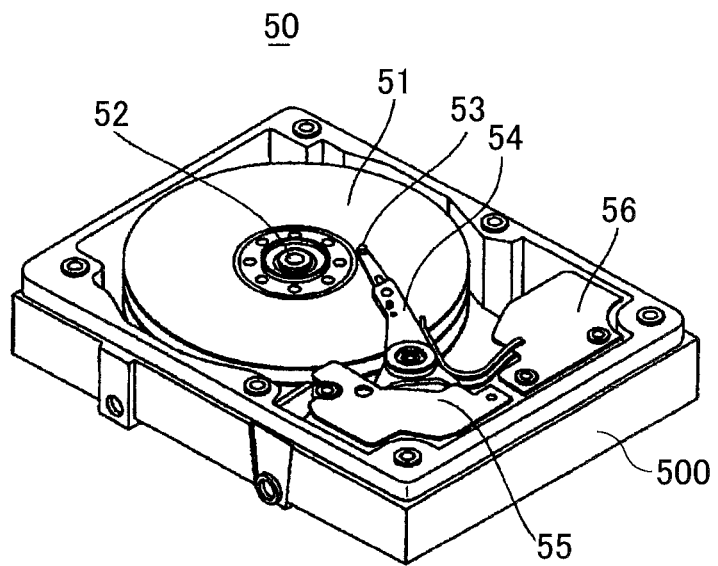
FIG. 3 is a perspective view illustrating an example of a structure of a magnetic storage apparatus.

FIG. 3 is a perspective view illustrating an example of a structure of the magnetic storage apparatus.

A magnetic storage apparatus 50 includes a magnetic recording medium 51, a driving mechanism 52 that drives the magnetic recording medium 51 to rotate in a recording direction, a magnetic head 53, a carriage 54 having the magnetic head 53 mounted thereon, a head moving mechanism 54 that moves the magnetic head 53 via the carriage 54, and a signal processor 56, that are accommodated within a casing 500. The signal processor 56 processes external information, to obtain signals to be recorded on the magnetic recording medium 51 by the magnetic head 53. The signal processor 56 also processes signal reproduced from the magnetic recording medium 51 by the magnetic head 53, to obtain information to be output from the magnetic storage apparatus 50 to an external device or the like, for example.

The magnetic recording medium 51 includes a disk-shaped substrate having an opening at a center thereof, and a magnetic recording layer, a protection layer, and a lubricant layer are successively formed in this order on both sides (that is, opposite surfaces) of the substrate.

Although FIG. 3 illustrates an example in which three magnetic recording media 51 are accommodated within the casing 500, the number of magnetic recording media 51 is not limited to three, and may be one, two, or more than three.

The present invention is not limited to the method of manufacturing the magnetic recording medium according to the embodiment described above, and various variations, modifications, and substitutions may be made without departing from the scope of the present invention.

Exemplary Implementations

<Manufacturing Unfinished Product of Magnetic Recording Medium>

Under an argon gas atmosphere at 1 Pa, a Cr-40Ti layer (adhesion layer) having a thickness of 10 nm is deposited by sputtering on both sides (that is, opposite surfaces) of a cleaned glass substrate (manufactured by HOYA Corporation) having an outer diameter of 2.5 inches.

Under the argon gas atmosphere at 1 Pa, a Fe-46Co-5Zr-3B layer (first soft magnetic layer) having a thickness of 34 nm is deposited by sputtering on the adhesion layer. Next, under the same deposition condition as the first soft magnetic layer, a Ru layer (spacer layer) having a thickness of 0.76 nm is deposited on the first soft magnetic layer, and a Fe-46Co-5Zr-3B layer (second soft magnetic layer) having a thickness of 34 nm is thereafter deposited on the spacer layer, to form the soft magnetic underlayer.

Under the argon gas atmosphere at 1 Pa, a Ni-6 W layer (first orientation control layer) having a thickness of 5 nm is deposited by sputtering on the soft magnetic underlayer, and a Ru layer (second orientation control layer) having a thickness of 10 nm is thereafter deposited by sputtering on the first orientation control layer. Next, under the argon gas atmosphere at 8 Pa, a Ru layer (third orientation control layer) having a thickness of 10 nm is deposited by sputtering on the second orientation control layer. Hence, the orientation control layer is formed by the first orientation control layer, the second orientation control layer, and the third orientation control layer.

Under the argon gas atmosphere at 1 Pa, a (72Co6Cr16Pt6Ru)-4$SiO_2$-3$Cr_2O_3$-2$TiO_2$ layer (first magnetic recording layer) having a thickness of 6 nm, a (65Co12Cr13Pt10Ru)-4$SiO_2$-3$Cr_2O_3$-2$TiO_2$ layer (second magnetic recording layer) having a thickness of 6 nm, and a Co15Cr16Pt6B layer (third magnetic recording layer) having a thickness of 3 nm are successively deposited by sputtering on the orientation control layer. Thus, the magnetic recording layer is formed by the first magnetic recording layer, the second magnetic recording layer, and the third magnetic recording layer.

A carbon layer (protection layer) having a thickness of 2.5 nm is deposited by ion beam deposition on the magnetic recording layer, to form the unfinished product of the magnetic recording medium.

Exemplary Implementation EI1

A perfluoropolyether (first organic fluorine compound) SH-1 manufactured by Solvay S.A., represented by a chemical formula $CF_3CF_2CF_2O(CF_2CF_2CF_2O)_mCF_2CF_2COOH$, having a carboxyl group at one terminal thereof, and a weight average molecular weight of 2000, is diluted by the fluorine solvent Vertrel XF manufactured by Chemours-Mitsui Fluoroproducts Co., Ltd., to obtain a coating liquid having an organic fluorine compound content of 0.3 mass %.

After dipping the unfinished product of the magnetic recording medium into a dipping vat (or bath) of a dip coating apparatus, filled with the coating liquid, the unfinished product of the magnetic recording medium is extracted from the dipping vat at a predetermined speed, to form a free layer having an average thickness of 4 Å (process A).

The thin film forming apparatus illustrated in FIG. 1 is used to form a bond layer on the unfinished product of the magnetic recording medium (process B). More particularly, after holding the unfinished product 7 of the magnetic recording medium on the holder 6, a perfluoropolyether (second organic fluorine compound) D02TS manufactured by Solvay S.A., represented by a chemical formula $CF_3(OCFCF_3CF_2)_n(OCF_2)_mOCF_3$, having a weight average molecular weight of 750, and a boiling point of 165° C., is evaporated and supplied into the chamber 2, and the pressure inside the chamber 2 is maintained at 170 Pa (0.00168 atm). The counter electrodes 3 used in this case are mesh electrodes having hexagonal holes. In addition, the unfinished product 7 of the magnetic recording medium is heated to 100° C. by the Pt heat provided on the holder 6. Next, the excimer lamp is used as the light source 5 to irradiate ultraviolet rays having a wavelength of 172 nm on the surfaces of the unfinished product 7 of the magnetic recording medium. Further, an AC voltage (high-frequency pulse bias voltage) having a pulse amplitude (zero-to-peak value) of 300 V and a pulse frequency of 20 kHz is applied between the unfinished product 7 of the magnetic recording medium and the counter electrodes 3, to deposit a bond layer, and a lubricant layer having an average thickness of 10 Å is formed, to obtain the magnetic recording medium according to an exemplary implementation EI1. In this example, a deposition time of the bond layer is 10 minutes.

The lubricant layer of the magnetic recording medium is analyzed using time of flight secondary ion mass spectrometry (TOF-SIMS). From this analysis, it may be assumed that the second organic fluorine compound is decomposed into an organic fluorine compound having a weight average molecular weight of 350 or less.

Exemplary Implementation EI2

A perfluoropolyether D02 manufactured by Solvay S.A., represented by a chemical formula $CF_3(OCFCF_3CF_2)_n(OCF_2)_mOCF_3$, having a weight average molecular weight of 760, and a boiling point of 175° C., is used as second organic fluorine compound. Otherwise, the manufacturing conditions of an exemplary implementation EI2 are the same as those of the exemplary implementation EI1. The magnetic recording medium is obtained by forming a lubricant layer having an average thickness of 10 Å.

The lubricant layer of the magnetic recording medium is analyzed using the TOF-SIMS. From this analysis, it may be assumed that the second organic fluorine compound is decomposed into an organic fluorine compound having a weight average molecular weight of 350 or less.

Comparison Example CE1

The process A is not performed. Otherwise, the manufacturing conditions of a comparison example CE1 are the same as those of the exemplary implementation EI1. The magnetic recording medium is obtained by forming a lubricant layer having an average thickness of 10 Å.

Comparison Example CE2

The process B is not performed. Otherwise, the manufacturing conditions of a comparison example CE2 are the same as those of the exemplary implementation EI1. The magnetic recording medium is obtained by forming a lubricant layer having an average thickness of 10 Å.

Comparison Example CE3

The process A is not performed. Otherwise, the manufacturing conditions of a comparison example CE3 are the same as those of the exemplary implementation EI2. The magnetic recording medium is obtained by forming a lubricant layer having an average thickness of 10 Å.

Next, the bonded ratio of the lubricant layer, and the dynamic coefficient of friction and the surface energy of the surface of the lubricant layer are evaluated for the magnetic recording medium according to the exemplary implementations EI1 and EI2 and the comparison examples CE1 through CE3.

[Bonded Ratio of Lubricant Layer]

The absorbance near the wavelength of 1270 $cm^{-1}$ before and after the magnetic recording medium is dipped in Vertrel XF manufactured by Chemours-Mitsui Fluoroproducts Co., Ltd. for five minutes using Fourier transform infrared spectroscopy (FT-IR), and the bonded ratio is obtained from the following formula.

(absorbance after dipping)/(absorbance before dipping)×100

[Dynamic Coefficient of Friction of Surface of Magnetic Recording Medium]

A test bin, having a radius of curvature of 2.55 mm and coated with a hard carbon layer having a thickness of 50 nm, is used to measure the dynamic coefficient of friction of the surface of the magnetic recording medium under conditions in which the rotational speed is 6 rpm, the weight is 0.2 mN, the temperature is 22° C., and the humidity is 40% RH.

[Surface Energy of Magnetic Recording Medium]

The contact angle is measured by dropping 5 μl of each of water and hexadecane onto the surface of the magnetic recording medium, and the surface energy is obtained from the following Girifalco-Good-Fowkes-Young's formula, where θ denotes the contact angle, $\gamma_s$ denotes a surface energy of solid, $\gamma_l$ denotes a surface energy of liquid, d denotes a dispersive component, and p denotes a polar component.

$$\cos\theta = -1 + \frac{2}{\gamma_l}\left[(\gamma_s^d \gamma_l^d)^{\frac{1}{2}} + (\gamma_s^p \gamma_l^p)^{\frac{1}{2}}\right]$$

In the magnetic recording medium, the lower the surface energy becomes, the higher the coverage of the lubricant layer becomes.

FIG. 4 is a diagram illustrating the evaluation results of the magnetic recording media according to the exemplary implementations EI1 and EI2, and the comparison examples CE1 through CE3.

It may be confirmed from the evaluation results of FIG. 4 that the magnetic recording media in which the bonded ratio of the lubricant layer is large, and the dynamic coefficient of friction and the surface energy of the surface on the side of the magnetic recording medium formed with the lubricant layer are low, can be obtained according to the exemplary implementations EI1 and EI2, without having to make the lubricant layer thick.

However, because the process A is not performed, the bonded ratio of the lubricant layer is small, and the dynamic coefficient of friction of the surface on the side of the magnetic recording medium formed with the lubricant layer is high, in the case of the magnetic recording media obtained according to the comparison examples CE1 and CE3.

Furthermore, because the process B is not performed, the surface energy of the surface on the side of the magnetic recording medium formed with the lubricant layer is high, in the case of the magnetic recording medium obtained according to the comparison example CE2.

Accordingly, embodiments and exemplary implementations of the present invention can manufacture a magnetic recording medium having a lubricant layer with a large bonded ratio, without making the lubricant layer thick, and having the dynamic coefficient of friction and the surface energy that are low at the surface on the side of the magnetic recording medium formed with the lubricant layer.

Although the exemplary implementations are numbered with, for example, "EI1," or "EI2,", the ordinal numbers do not imply priorities of the exemplary implementations.

Further, the present invention is not limited to these embodiments and exemplary implementations, but various variations, modifications, and substitutions may be made without departing from the scope of the present invention.

What is claimed is:

1. A method of manufacturing a magnetic recording medium, comprising: forming an unfinished product of the magnetic recording medium, including a magnetic recording layer and a protection layer that are successively formed on a substrate; and forming a lubricant layer on a surface of the protection layer of the unfinished product,
    wherein the protection layer includes carbon,
    wherein the forming the lubricant layer includes coating a first organic fluorine compound on the protection layer of the unfinished product to cause adsorption of the first organic fluorine compound to adsorption sites on the surface of the protection layer via a functional group at a terminal of the first organic fluorine compound, so that the first organic fluorine compound functions as a free layer, and
    after the coating, supplying a gas, including a second organic fluorine compound, onto the protection layer of the unfinished product, and decomposing the second organic fluorine compound by Townsend discharge and ultraviolet ray irradiation to cause chemical bonding of a decomposition product of the second organic fluorine compound onto the surface of the protection layer, so that the second organic compound functions as a bond layer,
    wherein the first organic fluorine compound has a carboxyl group or a hydroxyl group at one terminal thereof, and wherein the decomposition product of the second organic fluorine compound is in an active state under an environment of the Townsend discharge and the ultraviolet ray irradiation, and also chemically bonds to locations other than the adsorption sites on the surface of the protection layer.

2. The method of manufacturing the magnetic recording medium as claimed in claim 1, wherein the first organic fluorine compound has a perfluoropolyether structure, and a weight average molecular weight of 500 or greater.

3. The method of manufacturing the magnetic recording medium as claimed in claim 2, wherein
    the second organic fluorine compound has a perfluoropolyether structure, and a weight average molecular weight of 700 or greater, and
    the second organic fluorine compound is decomposed to generate a compound having a weight average molecular weight of 500 or less.

4. The method of manufacturing the magnetic recording medium as claimed in claim 1, wherein
    the second organic fluorine compound has a perfluoropolyether structure, and a weight average molecular weight of 700 or greater, and
    the second organic fluorine compound is decomposed to generate a compound having a weight average molecular weight of 500 or less.

5. The method of manufacturing the magnetic recording medium as claimed in claim 1, wherein
    the protection layer is a carbon layer doped with nitrogen, and
    the adsorption sites are carbon nitride.

6. The method of manufacturing the magnetic recording medium as claimed in claim 1, wherein
    the protection layer is a carbon layer, and
    the adsorption sites are concave or convex portions formed at the surface of the protection layer.

7. The method of manufacturing the magnetic recording medium as claimed in claim 1, further comprising:
    applying an AC bias voltage between the unfinished product of the magnetic recording medium and counter electrodes, thereby applying an AC electric field on opposite surfaces of the unfinished product of the magnetic recording medium.

8. The method of manufacturing the magnetic recording medium as claimed in claim 7, wherein the applying applies the AC bias voltage to the unfinished product of the magnetic recording medium via a conductive holder which holds the unfinished product of the magnetic recording medium inside a chamber.

9. The method of manufacturing the magnetic recording medium as claimed in claim 7, further comprising:
    adjusting an electric field intensity of the AC electric field so as to generate the Townsend discharge without generating glow discharge plasma between the unfinished product of the magnetic recording medium and the counter electrodes.

* * * * *